US006093776A

United States Patent [19]

Shih et al.

[11] Patent Number: 6,093,776

[45] **Date of Patent: *Jul. 25, 2000**

[54] WATER SOLUBLE DYE COMPLEXING POLYMERS

[75] Inventors: Jenn S. Shih, Paramus; Bala Srinivas, Hasbrouck Heights; John C. Hornby, Washington Township, all of N.J.

[73] Assignee: ISP Investments Inc., Wilmington, Del.

[ * ] Notice: This patent is subject to a terminal disclaimer.

[21] Appl. No.: 09/299,354

[22] Filed: Apr. 26, 1999

Related U.S. Application Data

[60] Continuation of application No. 09/044,616, Mar. 19, 1998, Pat. No. 5,929,175, which is a division of application No. 08/932,448, Sep. 19, 1997, Pat. No. 5,776,879.

[51] Int. Cl.[7] .......................... C08F 8/18; C08F 126/06; C08F 8/10

[52] U.S. Cl. .................................. 525/359.3; 525/327.1; 525/355; 526/265

[58] Field of Search .......................... 525/359.3, 327.1, 525/355; 526/258

[56] References Cited

U.S. PATENT DOCUMENTS 5,929,175 7/1999 Shih et al. .......................... 525/359.3

*Primary Examiner*—David W. Wu
*Assistant Examiner*—Tanya Zalukaeva
*Attorney, Agent, or Firm*—Walter Katz; William J. Davis; Marilyn J. Maue

[57] ABSTRACT

This invention relates to dye complexing polymers, and, more particularly, to water soluble poly(vinylpyridine betaines) containing a quaternary nitrogen and a carboxylate salt. The-polymers herein have effective dye transfer inhibitor (DTI) properties for use, for example, laundry detergent and fabric softener compositions.

1 Claim, No Drawings

WATER SOLUBLE DYE COMPLEXING POLYMERS

This is a continuation, of application Ser. No. 09/044,616, filed on Mar. 19, 1998 now U.S. Pat. No. 5,929,175, which is a division of Ser. No. 08/932,448, filed on Sep. 19, 1997 (now U.S. Pat. No. 5,776,879).

BACKGROUND OF THE INVENTION

1. Field of the Invention

This invention relates to dye complexing polymers, and, more particularly, to water soluble poly(vinylpyridine betaines) containing a quaternary nitrogen and a carboxylate salt. The polymers herein have effective dye transfer inhibitor (DTI) properties for use, for example, laundry detergent and fabric softener compositions.

2. Description of the Prior Art

Dye complexing polymers have been used in laundry detergent and fabric softener compositions. In such application, during washing a mixture of colored and white fabrics, some of the dyes may bleed out of a colored fabric under washing conditions. The degree of bleeding is influenced by the structure of the dye, the type of cloth and the pH, temperature and mechanical efficiency of the agitation process. The bled dye in the wash liquor can be totally innocuous and get washed off in the wash liquor. However, in reality, this fugitive dye has a tendency to redeposit either onto the same fabric or onto another fabric leading to patches and an ugly appearance of the washed material. This redeposition of the bled dye can be inhibited in several ways. One method is to introduce a DTI compound which can complex with the fugitive dye and get washed off thus preventing redeposition.

Polyvinylpyrrolidone (PVP), by virtue of its dye complexation ability, has been used to inhibit dye deposition during washing of colored fabrics under laundry conditions. The performance of PVP as a DTI, however, is adversely affected by the presence of anionic surfactants in the washing process.

Other polymers which have been used as DTIs in laundry detergent compositions include polyvinylpyridine N-oxide (PVPNO); polyvinylimidazole (PVI) and copolymers of polyvinylpyridine and polyvinylimidazole (PVP-PVI).

The prior art in this field is represented by the following patents and publications:

| | Patent | Subject Matter |
|---|---|---|
| (1) | JP 53-50732 | Formulas Nos. 3, 6 and (1) are water insoluble compounds and polymers used in printing ink compositions; |
| (2) | PCT/US94/06849 WO 95/03390 | Dye inhibiting composition polymers of PVP, polyamine N-oxide, vinylimidazole are used in laundry detergent compositions; |
| (3) | U.S. Pat. No. 5,460,752 | Polyamine N-oxide polymers described for use in laundry detergent compositions; |
| (4) | EPA 664335 A1 | Polysulfoxide polymers; |
| (5) | PCT/US93/10542 WO 94/11473 | Laundry compositions include polyamine-N-oxide and brighteners and surfactants; |
| (6) | PCT/EP93/02851 WO 94/10281 | PVP and PVI are present in laundry compositions; |
| (7) | PCT/US94/11509 WO 95/13354 | Poly(4-vinylpyridine-N-oxide) (PVPNO) and copolymers of VP and VI are described; |

-continued

| | Patent | Subject Matter |
|---|---|---|
| (8) | EP 754748 A1 | Vinylpyridine copolymers and formic acid; |
| (9) | EP 0664332 A1 | Polyamine oxide polymers; |
| (10) | U.S. Pat. No. 5,604,197 | PVPNO + clay softening; |
| (11) | U.S. Pat. No. 5,458,809 | PVPNO; |
| (12) | U.S. Pat. No. 5,466,802 | PVPNO and PVP-VI; |
| (13) | U.S. Pat. No. 5,627,151 | Copolymers of VP or VI; vinylpyridine or dimethylaminoethyl methacrylate or dimethylaminopropylmethacrylamide, including up to 20% vinylacetate; |
| (14) | PCT/US95/04019 WO 95/27038 | PVPNO, PVP, PVP-PI and copolymers of VP and VI; |
| (15) | EPA 628624 A1 | PVPNO with protease; |
| (16) | DE 4224762 A1 | VP polymers; |
| (17) | J. Polymer Sci. 26, No. 113, p. 25–254 (1957) | Water-insoluble poly(4-vinylpyridine) compounds and polymers |

Accordingly, it is an object of this invention to provide new and improved water soluble dye complexing polymers.

Another object herein is to provide water soluble dye transfer inhibitor (DTI) polymers which are effective in laundry detergent compositions containing an anionic surfactant.

A feature of the invention is the provision of a water soluble poly(vinylpyridine betaine) containing a quaternary nitrogen and a carboxylate salt.

Another feature of the invention is the provision of laundry detergent compositions containing such new and improved water soluble polymers, which exhibit particularly effective dye transfer inhibition properties during the washing process even in the presence of anionic surfactants.

Among the other objects and features of the invention is to provide such polymers having dye complexing properties useful in fabric softener and textile dye treatment compositions.

SUMMARY OF THE INVENTION

A water soluble poly(vinylpyridine betaine) polymer contains a quaternary nitrogen and a carboxylate salt. The polymer has the formula:

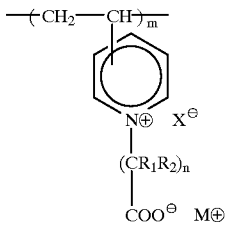

where m is indicative of the degree of polymerization;

X is an anion;

$R_1$ and $R_2$ are independently hydrogen, alkyl or aryl;

n is 1–5; and

M is a cation.

Preferred embodiments of the invention are polymers in which X is a halide; most preferably chloride or bromide; $R_1$ and $R_2$ are both hydrogen; n is 1; M is an alkali metal;

preferably sodium or potassium; and the polymer is 25–100% quaternized; most preferably 75–100%.

A preferred polymer has a weight average molecular weight of about 5,000 to 1,000,000; preferably 20,000 to 200,000, where m is about 30–5000, preferably 100–1000. Water soluble copolymers of the defined polymer above with polymerizable monomers, such as vinyl pyrrolidone, vinyl imidazole, acrylamide and vinyl caprolactam also are useful herein.

DETAILED DESCRIPTION OF THE INVENTION

In accordance with the invention, there is described herein a water soluble poly(vinylpyridine betaine) containing a quaternary nitrogen and a carboxylate salt. This polymer has dye completing properties, particularly dye transfer inhibitor properties, for use in laundry applications, having the formula:

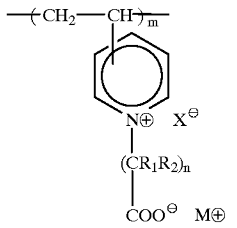

where m is indicative of the degree of polymerization;

X is an anion;

$R_1$ and $R_2$ are independently hydrogen, alkyl or aryl;

n is 1–5; and

M is a cation.

Preferred embodiments of the invention are polymers in which X is a halide; most preferably chloride or bromide; $R_1$ and $R_2$ are both hydrogen; n is 1; M is an alkali metal; preferably sodium or potassium; and the polymer is 25–100% quaternized; most preferably 75–100%.

A preferred polymer has a weight average molecular weight of about 5,000 to 1,000,000; preferably 20,000 to 200,000, where m is about 30–5000, preferably 100–1000. Water soluble copolymers of the defined polymer above with polymerizable monomers, such as vinyl pyrrolidone, vinyl caprolactam, vinyl imidazole, n-vinyl formamide, and acrylamide also are useful herein.

A preferred use of the polymer and copolymers herein are laundry detergent compositions including about 2–1000 ppm of the polymer or copolymer.

In a preferred embodiment of the invention, the water soluble polymers of the invention are made by polymerizing a vinylpyridine under suitable polymerization conditions to form a poly(vinylpyridine) intermediate, and then reacting the intermediate polymer with sodium chloroacetate in an aqueous medium. The reaction product is a poly (vinylpyridine betaine) polymer containing a quaternary nitrogen and a carboxylate salt.

In the polymerization step, which may be solution, precipitation or emulsion polymerization, any suitable solvent may be used, for example, an alcohol, such as methanol, ethanol or isopropanol; water; or mixtures of water and alcohol. The reaction temperature is about 400 to 150° C., preferably 50 to 90° C., and most preferably about 60° to 85° C. The polymerization initiator is a free radical initiator, such as perester, peroxide, percarbonate, or Vazo® type initiators may be used. The polymerization is carried out at a solids level of about 5 to 80%, preferably 20 to 50%.

A preferred polymer* made herein is poly(4-vinylpyridine) sodium carboxymethyl betaine chloride having the formula:

* POLYMER A

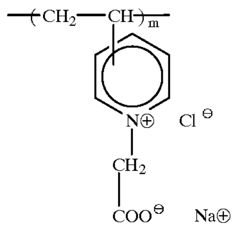

The invention will now be illustrated by the following examples, in which:

EXAMPLE 1

A 1-liter, 4-necked resin kettle was fitted with an anchor agitator, a nitrogen purge adaptor, a thermometer, two subsurface feeding tubes connected with two feeding pumps, and a reflux condenser. The kettle was charged with 150 g of 4-vinylpyridine and 150 g of isopropanol. Nitrogen purging was started and continued throughout the process as was agitation at 200 rpm. Then the reactants were heated to 80° C. in 20 minutes and held at that for 30 minutes. Then 390 microliter of t-butyl peroxypivalate (Lupersol® 11) was charged. The solution polymerization reaction was carried out at 80° C. for 2 hours. Then a 195 microliter portion of Lupersol® 11 was added and reaction continued at 80° C. for another two hours. The latter step was repeated another 6 times. Then 150 g water and 166.2 g of sodium chloroacetate was charged and the contents were rinsed with 100 g of water. The resultant mixture was heated to remove 100 g of distillate then 100 g of water was added to the mixture; the step was repeated and yet another 50 g of distillate was removed. Then the mixture was cooled to room temperature. The product was obtained as a solution whose solids level was adjusted to about 48%.

EXAMPLE 2

The process of Example 1 was repeated using 125 g of sodium chloroacetate. A similar product was obtained.

EXAMPLE 3

The process of Example 1 was repeated using 83 g of sodium chloroacetate. A similar product was obtained.

EXAMPLE 4

A 1-l, 4-necked resin kettle, fitted with an anchor agitator, a nitrogen purge adaptor, a thermometer and a reflux condenser, was charged with 50 g of 4-vinylpyridine, 50 g of vinylpyrrolidone and 150 g of isopropanol. Nitrogen purging was started and continued throughout the reaction, and the agitator was set at 20 rpm. The reactants were heated from ambient temperature (20–25° C.) to 80° C. in 20 minutes and held at 80° C. for 30 minutes. Then 0.1% (based on total weight of monomers) of t-butyl peroxypivalate (Lupersol® 11) was charged into the kettle and the reaction temperature was held at 80° C. for 2 hours. Thereafter 0.05% (based on total weight of monomers) of Lupersol® 11 was added every 2 hours and the reaction temperature was held at 80° C. until the residual 4-vinylpyridine level was reduced to less than 2%.

Then 250 g of water and 55.4 g of sodium chloroacetate were mixed and charged. The mixture was heated to remove the distillate. Additional water was added while removing distillate until all the ethanol was removed at about 105° C. The final solids level was controlled by addition of water to the final product.

EXAMPLE 5

Example 4 was repeated using 25 g of 4-vinylpyridine, 75 g of vinylpyrrolidone and 27.7 g of sodium chloroacetate, with similar results.

EXAMPLE 6

Example 1 was repeated using 186.5 g of sodium 2-chloropropionate in place of sodium chloroacetate with similar results.

EXAMPLE 7

Example 1 was repeated using 186.5 g of sodium 1-chloropropionate with similar results.

EXAMPLE 8

A 1-l, 4-necked resin kettle, fitted with anchor agitator, a nitrogen purge adaptor, a thermometer and a reflux condenser was charged with 150 g of 4-vinylpyridine and 150 g of isopropanol. The reactants were heated from ambient temperature (20–25° C.) to 80° C. in 20 minutes and held at 80° C. for 30 minutes. Then 0.1% (based on total weight of monomers) of t-butyl peroxypivalate (Lupersol 11) was charged into the kettle and the reaction temperature was held at 80° C. for 2 hours. Then 0.05% (based on total weight of monomers) of Lupersol® 11 was added every 2 hours at 80° C. until residual 4-vinylpyridine was reduced to less than 2%.

The reaction mixture was cooled to 40° C. and 250 g of water and 57.2 g of sodium hydroxide were mixed and charged. Then 135.1 g of chloroacetic acid was pumped into the reactor by melting chloroacetic acid. The mixture was heated to remove the distillate, and water was added while removing distillate until all the ethanol was removed.

TEST RESULTS

The effectiveness of the polymers of the invention as a DTI additive in a laundry detergent composition was tested against control and other known DTI polymers in a test simulating actual laundry washing conditions. The test was carried out on a composition containing 10 ppm of the polymer, 10 ppm of a dye and 1 g/l of a laundry detergent which contained a mixture of both an anionic and a nonionic surfactant. The solution was diluted with water to 1-l.

Three white cotton cloth swatches #400 (bleached and desized) were immersed in the test solution at 100° F. and the solutions were agitated for 10 minutes in a Terg-o-tometer (Instrument Marketing Services Co.). The cloths were then removed, excess solution squeezed out, the cloths washed again in clean water for 3 minutes, squeezed again and dried. Reflectance measurements were taken on this test material on a calorimeter. The reflectance readings were recorded as ΔE, which is a composite of the degree of whiteness, redness and blueness indices in the dyed cloth. These readings were taken as a direct measure of the degree of dye deposition under the test washing conditions.

The test results are shown in Tables 1 and 2 below.

TABLE 1*

| TEST SAMPLES | ΔE |
|---|---|
| Control | |
| White cloth | 0 |
| No polymer | 33 |
| Invention Polymers | |
| Example 1 (Polymer A; 100% quat) | 6.6 |
| Example 2 (Polymer A; 75% quat) | 7.7 |
| Example 3 (Polymer A; 50% quat) | 10.4 |
| Example 4 (Copolymer of VPyr + VP; 100% quat) (50:50)** | 10.9 |
| Example 5 (Copolymer of VPyr + VP; 100% quat) (25:75)** | 14.3 |
| Other Polymers | |
| PVP | 23.7 |
| PVPNO | 11.9 |
| PVI | 10.1 |
| PVP + PVI (60:40) | 8.2 |

*Direct Red 80
**Weight percent

TABLE 2*

| TEST SAMPLES | ΔE |
|---|---|
| Control | |
| No polymer | 34.2 |
| Invention Polymers | |
| Polymer A | 21.7 |
| Other Polymers | |
| PVP | 28.1 |
| PVPNO | 25.7 |
| P(VI-VP) | 31.7 |

*The dye was Direct Blue No. 1

While the invention polymers has been described as an additive in a laundry detergent composition, it will be understood that they can be used in other applications which require anti-deposition properties. Accordingly, the water soluble polymers of the invention can be used effectively to inhibit dirt or soil redeposition in institutional, household and industrial cleaners, and textile applications, for example. Accordingly, the following is a list of suitable uses for the polymers and copolymers of the invention:

(a) fabric softener;
(b) soil anti-redeposition;
(c) digital printing ink application;
(d) textile dye stripping;
(e) textile dye strike rate control;
(f) flocculating agent;
(g) adhesive;
(h) ion-exchange/membranes;
(i) removal of trace metals from water (Hg, Cd, Cu, Ni)/ water softening agent
(j) colloidal stabilization
(k) pumping oil from underground reservoirs
(l) personal care market, shampoos and hair conditioner
(m) cleaners and dish washing detergents, rinse aids;

(n) water treatment to prevent hot water salts from precipitation on sides of the wall; and (o) pigment dispersion.

While the invention has been described with particular reference to certain embodiments thereof, it will be understood that changes and modifications may be made which are within the skill of the art. Accordingly, it is intended to be bound only by the following claims, in which:

What is claimed is:

1. A process of making a water soluble poly-(4-vinylpyridine) betaine polymer having a weight average molecular weight of about 5,000 to 1,000,000 which comprises reacting sodium 2-chloropropionate with poly-(4-vinylpyridine).

* * * * *